United States Patent
Kochiyama et al.

(10) Patent No.: US 9,732,538 B2
(45) Date of Patent: Aug. 15, 2017

(54) LAMINATED SLIDING MEMBER AND SLIDING BEARING USING THE LAMINATED SLIDING MEMBER

(71) Applicant: OILES CORPORATION, Tokyo (JP)

(72) Inventors: Osamu Kochiyama, Ashikaga (JP); Hiroyuki Ogoe, Fujisawa (JP); Shinji Sato, Ashikaga (JP); Yoshiyuki Fujii, Ashikaga (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/903,927

(22) PCT Filed: Jun. 23, 2014

(86) PCT No.: PCT/JP2014/003346
§ 371 (c)(1),
(2) Date: Jan. 8, 2016

(87) PCT Pub. No.: WO2015/004865
PCT Pub. Date: Jan. 15, 2015

(65) Prior Publication Data
US 2016/0145886 A1 May 26, 2016

(30) Foreign Application Priority Data
Jul. 11, 2013 (JP) ................. 2013-145923

(51) Int. Cl.
*F16C 41/00* (2006.01)
*E04H 9/02* (2006.01)
(Continued)

(52) U.S. Cl.
CPC ............. *E04H 9/021* (2013.01); *A47B 91/06* (2013.01); *C10M 101/025* (2013.01);
(Continued)

(58) Field of Classification Search
CPC ...... F16C 17/04; F16C 17/08; F16C 33/1095; F16C 33/122; F16C 33/124; F16C 33/125;
(Continued)

(56) References Cited

U.S. PATENT DOCUMENTS

| 3,151,015 A | 9/1964 | Griffith |
| 6,983,681 B2 * | 1/2006 | Iwata ................ F04B 27/1054 92/12.2 |

(Continued)

FOREIGN PATENT DOCUMENTS

| CN | 100387694 C | 5/2008 |
| CN | 201473876 U | 5/2010 |

(Continued)

OTHER PUBLICATIONS

Translation of JP2009091447 obtained Dec. 9, 2016.*
(Continued)

*Primary Examiner* — James Pilkington
(74) *Attorney, Agent, or Firm* — Nixon & Vanderhye P.C.

(57) ABSTRACT

A laminated sliding member 1 includes a base body 4 having one flat surface 3 which is circular in a plan view and a solid lubricant layer 5 adhered to the flat surface 3 of the base body 4 and having a sliding surface 2 which is circular in a plan view.

17 Claims, 6 Drawing Sheets

(51) Int. Cl.
| | |
|---|---|
| *F16C 33/12* | (2006.01) |
| *F16C 17/04* | (2006.01) |
| *C10M 133/42* | (2006.01) |
| *C10M 169/04* | (2006.01) |
| *C10M 107/38* | (2006.01) |
| *E01D 19/04* | (2006.01) |
| *A47B 91/06* | (2006.01) |
| *C10M 101/02* | (2006.01) |
| *C10M 107/04* | (2006.01) |
| *C10M 125/24* | (2006.01) |
| *C10M 111/04* | (2006.01) |
| *E04B 1/98* | (2006.01) |

(52) U.S. Cl.
CPC ........ *C10M 107/04* (2013.01); *C10M 107/38* (2013.01); *C10M 111/04* (2013.01); *C10M 125/24* (2013.01); *C10M 133/42* (2013.01); *C10M 169/04* (2013.01); *E01D 19/042* (2013.01); *E01D 19/046* (2013.01); *E01D 19/047* (2013.01); *E04B 1/98* (2013.01); *F16C 17/04* (2013.01); *F16C 33/122* (2013.01); *C10M 2201/085* (2013.01); *C10M 2201/0853* (2013.01); *C10M 2205/143* (2013.01); *C10M 2205/163* (2013.01); *C10M 2213/0623* (2013.01); *C10M 2215/222* (2013.01); *C10M 2215/2203* (2013.01); *C10M 2223/04* (2013.01); *C10N 2230/06* (2013.01); *C10N 2250/08* (2013.01); *C10N 2250/121* (2013.01)

(58) Field of Classification Search
CPC .... F16C 33/203; F16C 33/205; F16C 33/206; E04H 9/02; E04H 9/021; E04H 9/022
See application file for complete search history.

(56) References Cited

U.S. PATENT DOCUMENTS

| | | | |
|---|---|---|---|
| 2007/0004843 | A1 | 1/2007 | Rokugawa et al. |
| 2010/0195942 | A1 | 8/2010 | Tavecchio |
| 2011/0190178 | A1 | 8/2011 | Rokugawa et al. |
| 2012/0178328 | A1* | 7/2012 | Ogoe .................... F16C 33/203 442/172 |

FOREIGN PATENT DOCUMENTS

| | | |
|---|---|---|
| CN | 202081378 U | 12/2011 |
| CN | 202595618 U | 12/2012 |
| EP | 1 637 579 A1 | 3/2006 |
| JP | 39-14852 | 7/1964 |
| JP | 45-5595 | 2/1970 |
| JP | 61-34430 | 8/1986 |
| JP | 5-310716 | 11/1993 |
| JP | 7-224049 | 8/1995 |
| JP | 10-280320 A | 10/1998 |
| JP | 11-182095 | 7/1999 |
| JP | 11-351325 A | 12/1999 |
| JP | 2004-190804 | 7/2004 |
| JP | 2004-339259 A | 12/2004 |
| JP | 2008-45722 | 2/2008 |
| JP | 2008-190674 | 8/2008 |
| JP | 2009-91447 | 4/2009 |
| JP | 2009-103194 A | 5/2009 |
| JP | 2012-36606 | 2/2012 |

OTHER PUBLICATIONS

Translation of JP2004190804 obtained Dec. 9, 2016.*
Translation of JP2008190674 obtained Dec. 9, 2016.*
Translation of CN202595618 obtained Feb. 1, 2017.*
Extended European Search Report mailed Jan. 18, 2017 in European Application No. 14822878.6 (9 pages).
International Search Report for PCT/JP2014/003346, mailed Aug. 12, 2014, 6 pages.

* cited by examiner (a)          (b)

(a)    (b)

LAMINATED SLIDING MEMBER AND SLIDING BEARING USING THE LAMINATED SLIDING MEMBER

This application is the U.S. national phase of International Application No. PCT/JP2014/003346 filed 23 Jun. 2014, which designated the U.S. and claims priority to JP Patent Application No. 2013-145923 filed 11 Jul. 2013, the entire contents of each of which are hereby incorporated by reference.

BACKGROUND

The present invention relates to a laminated sliding member and a sliding bearing using the laminated sliding member.

BACKGROUND ART

Conventionally, in obtaining a laminated sliding member containing a solid lubricant, a method is adopted, among others, wherein a cotton fabric base material is immersed in a phenolic resin varnish with a solid lubricant of such as a powder of graphite, molybdenum disulfide, or polytetrafluoroethylene resin dispersedly contained therein, and is then pulled up and appropriately heated to allow a solvent to dissipate, thereby obtaining a prepreg in which the solid lubricant is adhered to and impregnated into the cotton fabric base material, and this prepreg is laminated and molded.

PRIOR ART DOCUMENTS

Patent Documents

Patent Document 1: JP-B 39-14852
Patent Document 2: JP-A 11-182095

SUMMARY OF THE INVENTION

Problems that the Invention is to Solve

Incidentally, if the mixing ratio of the solid lubricant is reduced to a relatively low level in order to maintain the operational efficiency at the time of forming the prepreg by the immersion and pulling up of the cotton fabric base material, the coefficient of friction cannot be lowered and sufficient wear resistance cannot be obtained.

In addition, even if the mixing ratio of the solid lubricant can be increased, the mixture of the phenolic resin and the solid lubricant is not sufficiently filled into gaps between fibrous tissues of the cotton fabric base material by simple immersion, and the mixture cannot necessarily be adhered sufficiently to the base material. If lamination molding is effected by using such a prepreg, the laminated sliding member obtained can possibly undergo interlayer delamination, with the result that the mechanical strength of the laminated sliding member can possibly decline appreciably.

To overcome such a problem, Patent Document 1 discloses a method wherein the solid lubricant is adhered to substantially only the surface of a reinforcing base material by impregnating the reinforcing base material with a synthetic resin varnish in advance and then by applying a varnish containing a solid lubricant to this varnish-impregnated reinforcing base material or applying an aqueous dispersion of the solid lubricant thereto. In the method disclosed therein as well, the low friction properties, wear resistance, and the like of the laminated sliding member are not necessarily sufficient.

Particularly in recent years, in cases where such a laminated sliding member is used as a sliding seismic isolation apparatus for reducing seismic force applied to a structure such as a building, a bridge, and an elevated road by installing the laminated sliding member as a sliding bearing or installing the laminated sliding member in combination with a resilient bearing apparatus for supporting the structure such as the building, the bridge, and the elevated road in the fields of construction and civil engineering, there is a problem in that the laminated sliding member is difficult to use from the standpoints of low friction properties and wear resistance.

In addition, as an example in which such a sliding member is applied to a sliding seismic isolation apparatus, a seismic isolation apparatus is disclosed in Patent Document 2, wherein a polyethylene terephthalate woven fabric is impregnated with a resin composition in which a tetrafluoroethylene resin is added to an unsaturated polyester resin.

Such a sliding member enables application to a sliding seismic isolation apparatus which could not be achieved by conventional sliding members. With the sliding seismic isolation apparatus, however, the initiation of sliding due to the seismic force is largely affected by the level of the coefficient of friction, and in the case where the coefficient of friction is 0.1 or thereabouts, the sliding member does not start sliding unless the seismic force reaches 0.1 G (gal), so that the sliding member proposed in Patent Document 2 is still not necessarily satisfactory in terms of the low friction properties and has the possibility of hampering the function of the seismic isolation apparatus.

To reduce the coefficient of friction, it is conceivable to adopt a means such as formation of a lubricating film of a solid lubricant or the like on the sliding surface of the seismic isolation apparatus; however, if the seismic isolation apparatus is subjected to high-velocity sliding during an earthquake, e.g., high-speed sliding of 60 cm/s, its sliding surface reaches a temperature of 100° C., so that the lubricating film can melt and flow out from the sliding surface, thereby possibly aggravating the sliding properties appreciably.

The present invention has been devised in view of the above-described circumstances, and its object is to provide a laminated sliding member which has low friction properties, and which, when subjected to high-velocity sliding during an earthquake, is capable of preventing the efflux of a solid lubricant layer due to a rise in sliding frictional heat, and which, even if a load is concentrated on the sliding surface, does not cause such as damage and deformation of the solid lubricant layer in the sliding surface, as well as a sliding bearing using the laminated sliding member.

Means for Solving the Problems

A laminated sliding member in accordance with the present invention comprises: a base body having a plurality of recessed portions in one flat surface thereof; and a solid lubricant layer adhered to at least the one flat surface of the base body in such a manner as to extend to the recessed portions of the base body, wherein the base body has a laminate having the one flat surface and formed by superposing and mutually joining a plurality of polyester fiber woven fabrics impregnated with a resol-type phenolic resin containing a polytetrafluoroethylene resin, the plurality of recessed portions being disposed in the laminate by being located in an area exclusive of and inwardly of an annular outer flat surface of the one flat surface of the laminate, bounded by an outer peripheral edge of the one flat surface of the laminate and by an imaginary line located in such a way as to be spaced apart a predetermined distance inwardly from the outer peripheral edge and similar in shape to the outer peripheral edge, the plurality of recessed portions being open at an inner flat surface of the one flat surface of the laminate surrounded by the imaginary line, each of the plurality of recessed portions being defined by a cylindrical wall surface in the laminate and a circular bottom wall surface in the laminate, and wherein the one flat surface of the laminate constituted by the inner flat surface and the annular outer flat surface, the cylindrical wall surfaces, and the circular bottom wall surfaces have hair-like fluff of the polyester fiber woven fabric, and the solid lubricant layer is adhered to at least the one flat surface of the laminate in such a manner as to be formed integrally with the fluff in mixed form and to extend to the recessed portions in the laminate.

According to the laminated sliding member in accordance with the present invention, since the solid lubricant layer is adhered to the one flat surface of the laminate in such a manner as to be formed integrally in mixed form with the hair-like fluff of the polyester fiber woven fabric on the one flat surface of the laminate, the cylindrical wall surfaces, and the circular bottom wall surfaces, even when the solid lubricant layer is fused due to a rise in sliding frictional heat, efflux of the solid lubricant layer can be obviated. Moreover, since the plurality of recessed portions are respectively open at the inner flat surface exclusive of the annular outer flat surface of the laminate, even if a load is concentrated on the annular outer flat surface, defects including damage such as cracking and chipping, deformation, and the like at the annular outer flat surface in the vicinity of the outer peripheral edge do not occur.

In the present invention, the base body may further have another laminate which is integrally joined to another surface of the laminate and in which a plurality of sheets of inorganic fiber woven fabric or organic fiber woven fabric are superposed one upon another and joined to each other. If the base body further has such another laminate, the other laminate can be made to function as a metal backing, and it is possible to further increase the mechanical strength of the base body, thereby making it possible to further eliminate defects including damage such as cracking and chipping, deformation, and the like at the annular flat surface in the vicinity of the outer peripheral edge.

In a preferred example of the laminated sliding member in accordance with the present invention, the predetermined distance in a perpendicular direction perpendicular to the outer peripheral edge (in the case where the one flat surface is circular in a plan view, in a radial direction thereof) from the outer peripheral edge of the one flat surface of the base body to the imaginary line is 0.5- to 1.1-fold an opening diameter of the recessed portion.

As such a distance is 0.5- to 1.1-fold the opening diameter of the recessed portion, it was experimentally confirmed that it is possible to more effectively obviate defects including damage such as cracking and chipping, deformation, and the like due to the concentration of stress on the annular outer flat surface of the one flat surface between the outer peripheral edge of the one flat surface of the base body and the imaginary line.

If the predetermined distance is less than 0.5-fold the opening diameter of the recessed portion, the width, in the perpendicular direction perpendicular to the outer peripheral edge, of the annular outer flat surface becomes narrow, so that when a load is applied to the annular outer flat surface having the narrow width, damage such as cracking and chipping can possibly occur easily at the outer peripheral edge of the one flat surface of the base body. On the other hand, if the predetermined distance exceeds 1.1-fold the opening diameter of the recessed portion, an anchor effect with respect to the solid lubricant layer covering the annular outer flat surface becomes insufficient, so that the solid lubricant layer adhered to the one flat surface can possibly flow out.

In the laminated sliding member in accordance with the present invention, the plurality of recessed portions may be arranged by respectively having centers on a plurality of imaginary concentric annular lines which have a center on the one flat surface of the laminate and equal intervals between each other in an outward direction from the center, and are similar in shape to the outer peripheral edge. In such a case, it suffices if the imaginary line is an envelope with respect to cylindrical wall surfaces defining the plurality of recessed portions arranged by respectively having centers on an outermost concentric circle.

Since such a plurality of recessed portions exhibit the anchor effect with respect to the solid lubricant layer in the sliding direction, it is possible to prevent as practically as possible the efflux of the solid lubricant layer due to a rise in the sliding frictional heat of the solid lubricant layer covering the one flat surface.

In the laminated sliding member in accordance with the present invention, with respect to the perpendicular direction perpendicular to the outer peripheral edge of the one flat surface, an interval in the perpendicular direction between two adjacent recessed portions, i.e., each distance (width between adjacent concentric lines), in the perpendicular direction perpendicular to the outer peripheral edge, between adjacent concentric lines among the plurality of concentric lines, is preferably 1.5- to 1.8-fold the opening aperture of the recessed portion.

If each such distance between the adjacent concentric lines is less than 1.5-fold the opening aperture of the recessed portion, the number of recessed portions arranged on the one flat surface becomes excessively large, which can possibly bring about a decline in the strength of the laminated sliding member, whereas if that distance exceeds 1.8-fold the opening aperture of the recessed portion, the anchor effect derived from the recessed portions of the solid lubricant layer becomes insufficient, possibly resulting in the flow out of the solid lubricant layer.

In the laminated sliding member in accordance with the present invention, the one flat surface is circular in a plan view, the plurality of imaginary concentric annular lines are constituted by a plurality of imaginary concentric circles, and on an n-th (n is a positive integer) imaginary concentric circle from the center of the one flat surface among the plurality of imaginary concentric circles, a 6×n number of recessed portions are respectively arranged at mutually equal center angles between adjacent ones of the recessed portions with respect to n-th imaginary concentric circle.

In the case where the one flat surface of the base body is circular in a plan view, and the plurality of imaginary concentric annular lines are constituted by a plurality of imaginary circles, if the recessed portions are arranged in the above-described manner, the recessed portions are present in all the radially outward direction from the center of the one flat surface, so that the anchor effect of the recessed portions with respect to the solid lubricant layer is exhibited in all the sliding directions, thereby making it possible to prevent the flowout of the solid lubricant layer from the one surface as practically as possible.

In the present invention, the one flat surface of the base body may be circular in a plan view as described above, and the plurality of imaginary concentric annular lines may be constituted by concentric circles; however, the one flat surface of the base body suffices if it has a polygonal shape in a plan view, including a rectangular shape in a plan view and a regular polygonal shape in a plan view, or a circular shape in a plan view. In a case where the one flat surface of the base body has a rectangular shape in a plan view or a regular polygonal shape in a plan view, the center of the one flat surface is a figure center of gravity (plan figure center of gravity) of that shape; the perpendicular direction perpendicular to the outer peripheral edge is a direction perpendicular to each side; the imaginary line is constituted by a rectangular or regular polygonal line similar to such a rectangle or polygon; and the imaginary lines have the center of gravity at an identical position. On the other hand, in a case where the plurality of imaginary concentric annular lines are constituted by a plurality of rectangular or regular polygonal lines having different distances from such a center of gravity in the perpendicular direction, and the one flat surface of the base body is circular in a plan view, the center of the one flat surface becomes the center of this circle, the perpendicular direction perpendicular to the outer peripheral edge is the radial direction of the circle, the imaginary line is constituted by a circle, the outer flat surface is annular in shape, and the inner flat surface is circular in shape.

In the laminated sliding member in accordance with the present invention, the laminate preferably comprises 40 to 60% by mass of a resol-type phenolic resin, 10 to 30% by mass of a polytetrafluoroethylene resin, and 25 to 35% by mass of a polyester fiber woven fabric.

In the laminated sliding member in accordance with the present invention, the solid lubricant layer may contain a hydrocarbon-based wax, polytetrafluoroethylene, melamine cyanurate, and a phosphate, in which case, in a preferred example, the solid lubricant layer contains 20 to 40% by mass of the hydrocarbon-based wax, 20 to 50% by mass of the polytetrafluoroethylene, 15 to 30% by mass of the melamine cyanurate, and 5 to 15% by mass of the phosphate.

In the laminated sliding member in accordance with the present invention, the base body may have a flat other surface, or may alternatively have a convex spherical other surface, and such other surface may be circular in a plan view, but may have a polygonal shape in a plan view, including a rectangular shape in a plan view and a regular polygonal shape in a plan view.

A sliding bearing in accordance with the present invention comprises: a lower shoe having a recessed portion which is open at one flat surface thereof; a rubber elastomer which is accommodated tightly in the recessed portion of the lower shoe, and has an annular notched stepped portion at an outer peripheral edge of an upper surface thereof; an annular ring fitted and fixed in the notched stepped portion; an intermediate plate which is disposed on the upper surface of the rubber elastomer so as to be swingable and rotatable relative to the lower shoe, and has a recessed portion in an upper surface thereof; the above-described laminated sliding member fitted and fixed in the recessed portion of the intermediate plate; and an upper shoe having fixed thereon a slide plate which is brought into slidable contact with the solid lubricant layer of the laminated sliding member. In such a sliding bearing, the recessed portion of the lower shoe, the rubber elastomer, and the intermediate plate may have a circular shape in a plan view in correspondence with the circular shape in a plan view of the laminated sliding member, or a polygonal shape in a plan view, including a rectangular shape in a plan view or a regular polygonal shape in a plan view, but have a circular shape in a plan view in a preferred example. In addition, in the sliding bearing in accordance with the present invention, the annular ring may have a synthetic resin-made protective ring which is fitted in the annular notched stepped portion of the rubber elastomer and a metallic compression ring which is disposed on an upper surface of the protective ring and is fitted in the annular notched stepped portion of the rubber elastomer. Furthermore, another sliding bearing in accordance with the present invention comprises: a lower shoe having a concave spherical surface on one surface thereof; the above-described laminated sliding member which is disposed on the lower shoe such that a convex spherical other surface thereof is brought into contact with the concave spherical surface of the lower shoe; and an upper shoe having fixed thereon a slide plate which is brought into slidable contact with the solid lubricant layer of the laminated sliding member.

Advantages of the Invention

In accordance with the present invention, it is possible to provide a laminated sliding member which has low friction properties, and which, when subjected to high-velocity sliding during an earthquake, is capable of preventing the efflux of the solid lubricant layer from the one flat surface due to a rise in sliding frictional heat, and which, even if a load is concentrated on the sliding surface, does not cause defects including damage such as cracking and chipping, deformation, and the like in the sliding surface, as well as a sliding bearing using the laminated sliding member.

Figure 1:
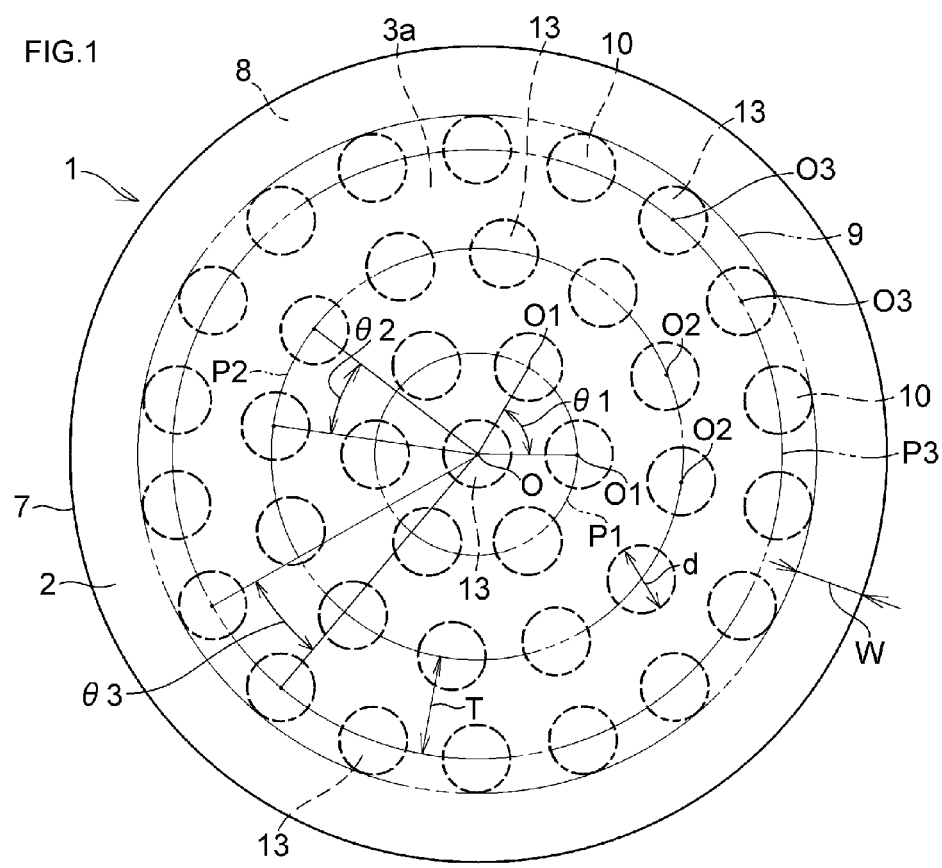
FIG. 1 is an explanatory plan view of an embodiment of the present invention.
Figure 5:
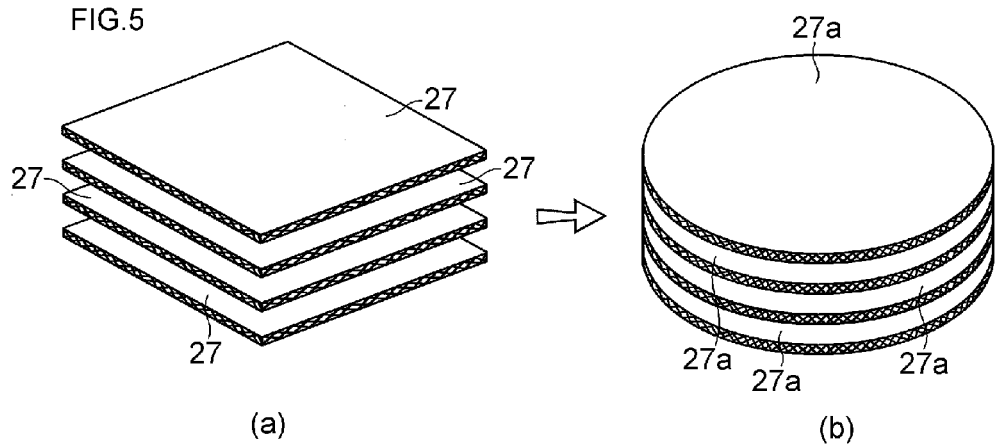
Figure 6:
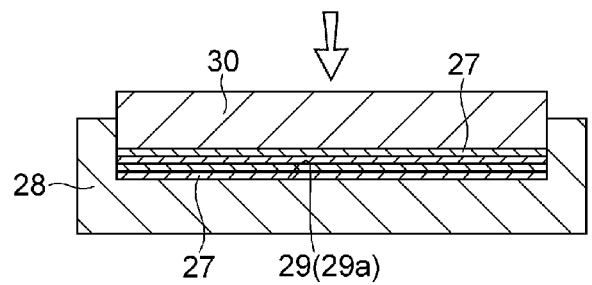
Figure 7:
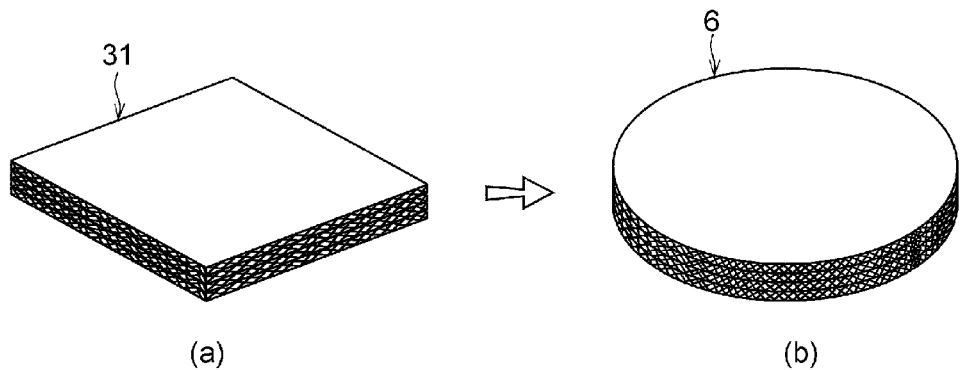
Figure 8:
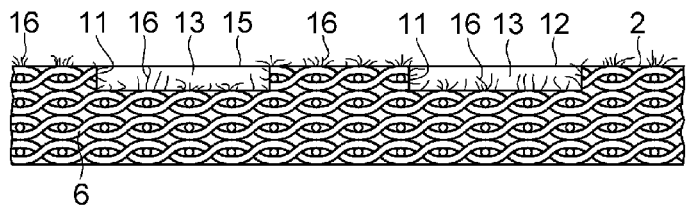
Figure 9:
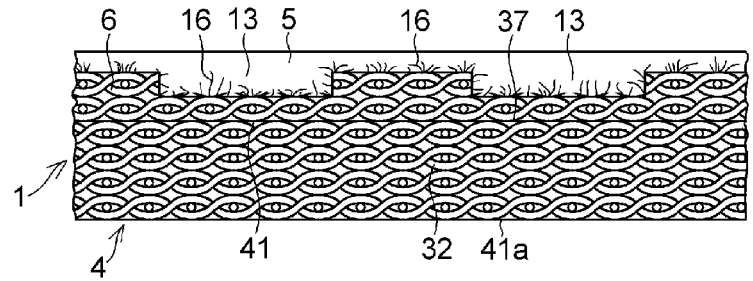
Figure 10:
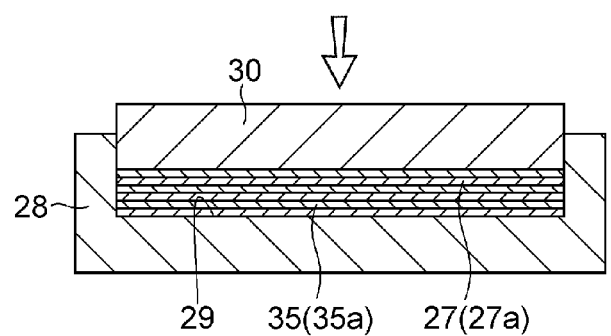
Figure 11:
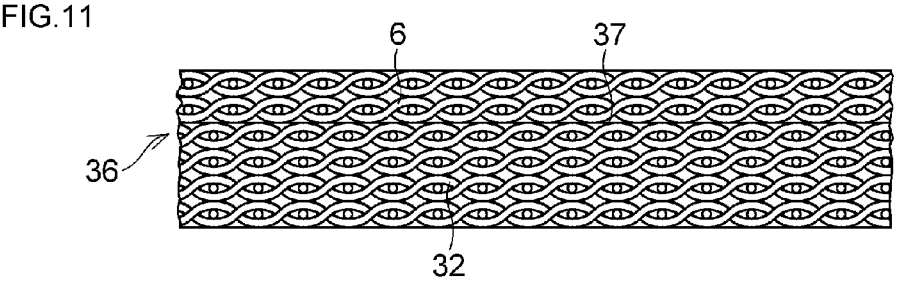
Figure 12:
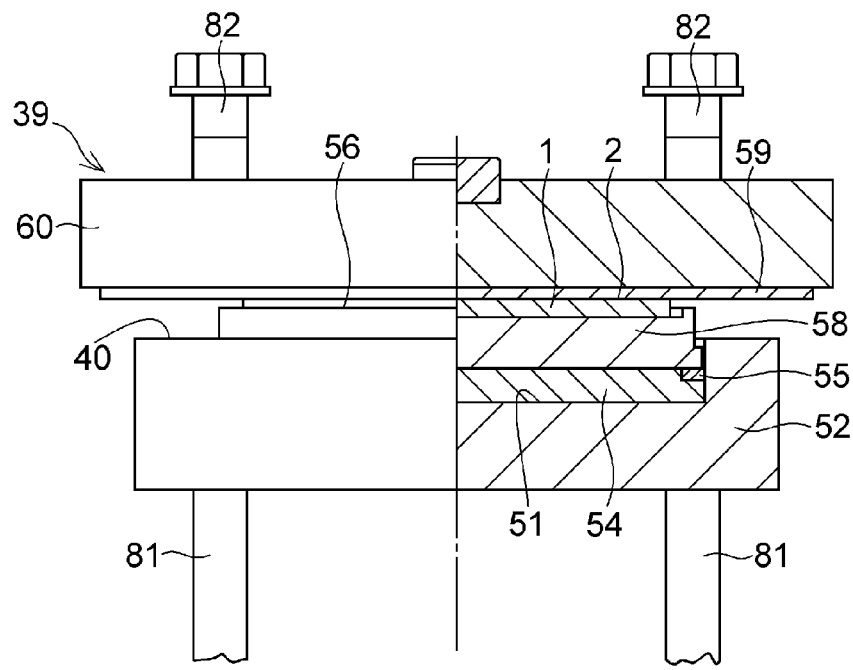
Figure 13:
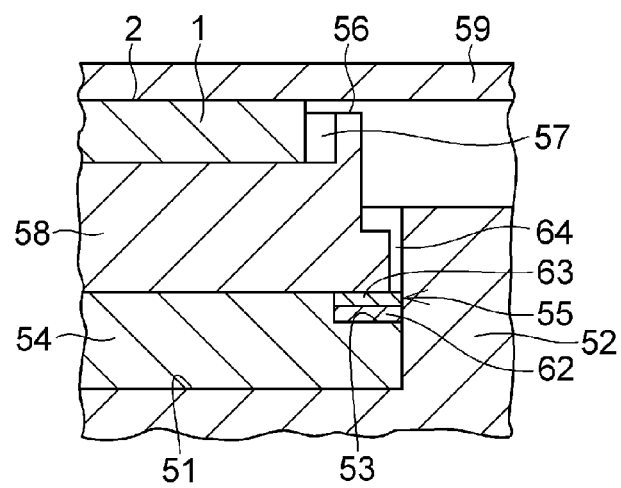
Figure 14:
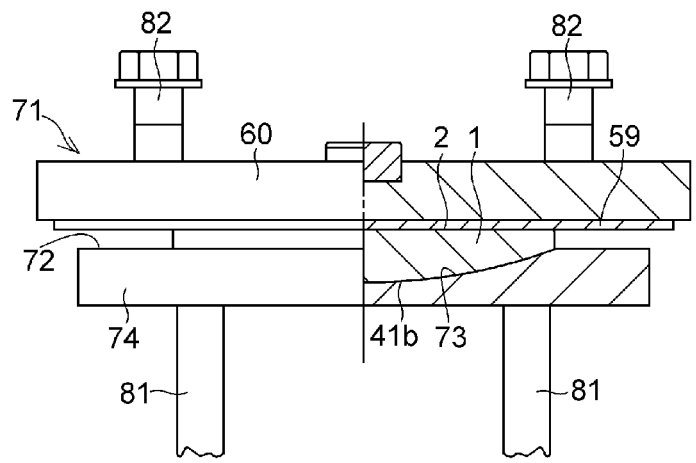
Figure 15:
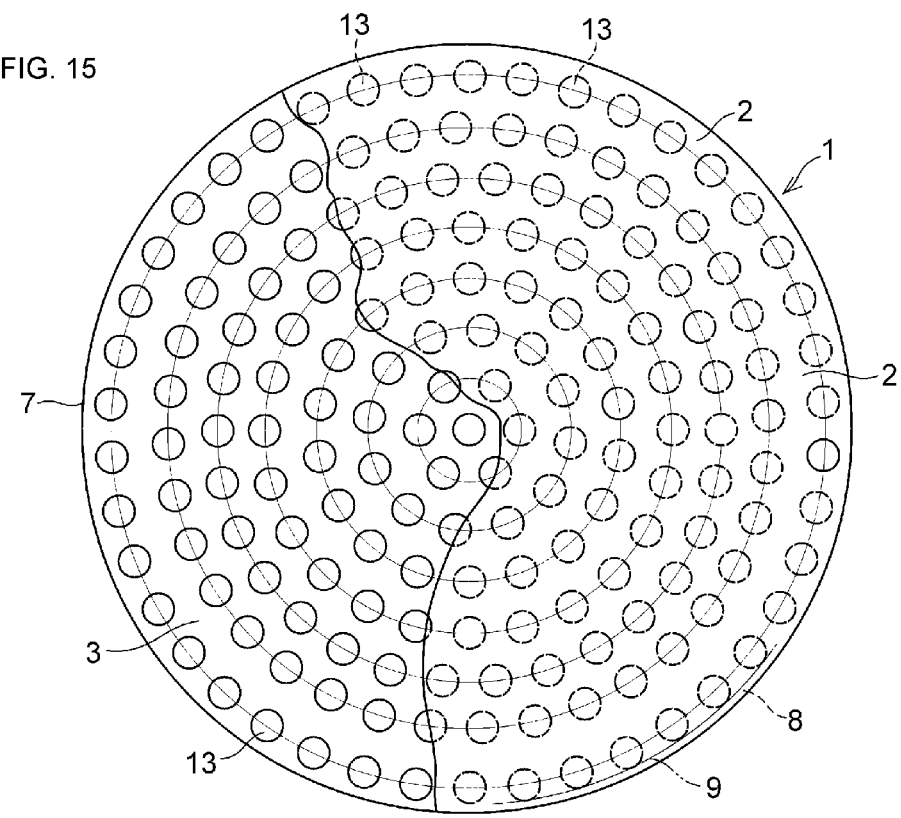

Parts (a) and (b) of FIG. 5 are explanatory perspective views of prepregs for forming a laminate of the embodiment shown in FIG. 1;

FIG. 6 is an explanatory cross-sectional view of one example of the method of manufacturing the laminate of the embodiment shown in FIG. 1 using the prepregs shown in FIG. 5;

FIG. 7 is an explanatory perspective view of the laminate in the embodiment shown in FIG. 1;

FIG. 8 is an explanatory partially enlarged of the laminate in the embodiment shown in FIG. 1;

FIG. 9 is an explanatory diagram of an example of the manufacturing method in accordance with another embodiment of the present invention;

FIG. 10 is an explanatory cross-sectional view of an example of the manufacturing method in accordance with the other embodiment shown in FIG. 9;

FIG. 11 is an explanatory partially enlarged cross-sectional view of the example shown in FIG. 9;

FIG. 12 is an explanatory cross-sectional view of a preferred embodiment of a sliding bearing in accordance with the present invention;

FIG. 13 is an explanatory partially enlarged cross-sectional view of the embodiment shown in FIG. 12;

FIG. 14 is an explanatory vertical cross-sectional view of another preferred embodiment of the sliding bearing in accordance with the present invention; and FIG. 15 is an explanatory plan view of Comparative Example.

DETAILED DESCRIPTION

Next, a more detailed description will be given of the present invention and a mode for carrying it out with reference to the preferred embodiments illustrated in the drawings. It should be noted that the invention is not limited to these embodiments.

Figure 2:
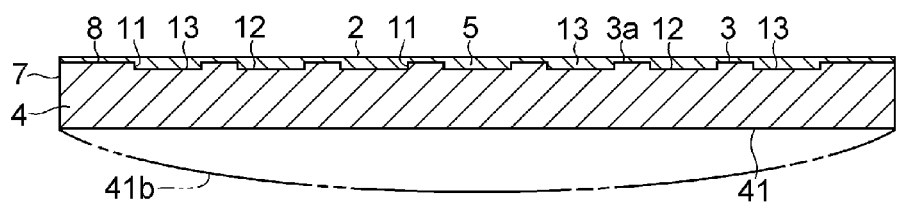
FIG. 2 is an explanatory cross-sectional view of the embodiment shown in FIG. 1.
Figure 3:
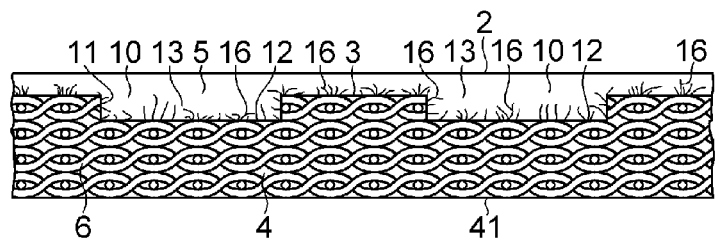
FIG. 3 is an explanatory partially enlarged cross-sectional view of FIG. 2.

In FIGS. 1 to 3, a laminated sliding member 1 is comprised of a base body 4 having one flat surface 3 which is circular in a plan view and a solid lubricant layer 5 adhered to the flat surface 3 of the base body 4 and having a sliding surface 2 which is circular in a plan view.

The base body 4, which has a laminate 6 having the flat surface 3 and formed by superposing and mutually joining a plurality of polyester fiber woven fabrics impregnated with a resol-type phenolic resin containing a polytetrafluoroethylene resin, has a plurality of recessed portions 13 which are disposed in the laminate 6 by being located in an area exclusive of and radially inwardly of an annular flat surface 8, i.e., an annular outer flat surface of the flat surface 3, bounded by an outer peripheral edge 7 of the flat surface 3 of the laminate 6 and by a circle 9 located in such a way as to be spaced apart a desired distance W radially inwardly from the outer peripheral edge 7 and serving as an imaginary line similar in shape to the outer peripheral edge 7, and which are open at a circular flat surface 3a, i.e., an inner flat surface of the flat surface 3 surrounded by the circle 9, and are each defined by an opening plane 10 which is circular in a plan view at the circular flat surface 3a, a cylindrical wall surface 11 in the laminate 6, and a circular bottom wall surface 12 in the laminate 6. The flat surface 3 constituted by the circular flat surface 3a and the annular flat surface 8, the cylindrical wall surface 11, and the circular bottom wall surface 12 have hair-like fluff 16 of the polyester fiber woven fabric, and the solid lubricant layer 5 is adhered to the flat surface 3, which is constituted by the circular flat surface 3a and the annular flat surface 8 in the laminate 6, in such a manner as to be formed integrally with the fluff 16 in mixed form and to extend to the recessed portions 13 in the laminate 6.

The distance (radial width) W is 0.5 to 1.1 times a diameter d of the opening plane 10 of the recessed portion 13, and the plurality of recessed portions 13 are arranged by respectively having centers O1, O2, and O3 on a plurality of imaginary concentric circles P1, P2, and P3 which are imaginary concentric annular lines having a center O, i.e., a circular plan figure center of gravity of the flat surface 3 of the laminate 6, and equal intervals T between each other in a radially outward direction from the center O. On respective ones of n-th (n is a positive integer) imaginary concentric circles P1, P2, and P3 from the center of the flat surface 3, 6×n numbers of recessed portions 13, i.e., in this embodiment, 6, 12, and 18 recessed portions 13, are respectively arranged on the concentric circles P1, P2, and P3 at mutually equal center angles θ1 (=60°), θ2 (=30°), and θ3 (=20°) between adjacent ones of the recessed portions 13 with respect to respective ones of the concentric circles P1, P2, and P3. The equal interval T is 1.5 to 1.8 times the diameter d of the opening plane 10, and the imaginary circle 9 constitutes an envelope of the cylindrical wall surfaces 11 defining the 18 recessed portions 13 arranged by respectively having centers O3 on the concentric circle P3.

The resol-type phenolic resin impregnated in the polyester fiber woven fabric, i.e., a reinforcing base material, is synthesized from a phenolic compound containing 50 to 100 mol % of bisphenol A and a formaldehyde compound in the presence of an amine as a catalyst, and has a number average molecular weight Mn of 500 to 1000 as measured by gel permeation chromatography (GPC) and a degree of dispersion Mw/Mn of 2.5 to 15 as defined by the ratio of the weight average molecular weight Mw to the number average molecular weight Mn.

As for the resol-type phenolic resin, the ratio of bisphenol A ($C_{15}H_{16}O_2$) among phenolic compounds is set to 50 to 100 mol %. This is the ratio of the number of moles of bisphenol A to the combined number of moles of total phenolic compounds charged at the start of synthesis.

The resol-type phenolic resin after the synthesis has the number average molecular weight Mn of 500 to 1000 as measured by GPC and the degree of dispersion Mw/Mn of the molecular weight distribution of 2.5 to 15. In this resol-type phenolic resin, affinity with the polyester fiber woven fabric serving as the reinforcing base material is improved remarkably; therefore, adhesiveness to the polyester fiber woven fabric is excellent without subjecting the polyester fiber woven fabric to surface treatment. The laminate 6 formed by using such polyester fiber woven fabrics has high rigidity, excels in mechanical strength, and has extremely low swellability in use in a wet atmosphere such as in water.

In the resol-type phenolic resin, if bisphenol A is less than 50 mol %, sufficient affinity with the polyester fiber woven fabric cannot be obtained, and sufficient adhesiveness to the polyester fiber woven fabric cannot be obtained. In addition, the resol-type phenolic resin should preferably have the number average molecular weight Mn of 500 to 1000 as measured by GPC and the degree of dispersion Mw/Mn of 2.5 to 15. If the number average molecular weight Mn is less than 500, even if affinity with the polyester fiber woven fabric is satisfactory, a decline in mechanical strength is brought about, whereas if the number average molecular weight Mn exceeds 1000, the viscosity of the resol-type phenolic resin becomes excessively high, and impregnation into the polyester fiber woven fabric becomes difficult. Further, if the degree of dispersion Mw/Mn is less than 2.5, sufficient adhesiveness to the polyester fiber woven fabric cannot be obtained, whereas if the degree of dispersion Mw/Mn exceeds 15, impregnation into the polyester fiber woven fabric becomes difficult in the same way as the case where the number average molecular weight Mn exceeds 1000.

In cases where bisphenol A among phenolic compounds is less than 100 mol %, a phenolic compound or compounds other than bisphenol A are included. As the phenolic compounds other than bisphenol A, it is possible to cite phenol, cresol, ethylphenol, aminophenol, resolcinol, xylenol, butylphenol, trimethylphenol, catechol, phenylphenol, and the like. Among them, phenol is preferably used by virtue of its characteristics. The phenolic compounds other than bisphenol A may be used singly or as a mixture of two or more kinds.

As the formaldehyde compounds, it is possible to cite formalin, paraformaldehyde, salicylaldehyde, benzaldehyde, p-hydroxybenzaldehyde, and the like. In particular, formalin and paraformaldehyde are preferably used in view of readiness of synthesis. The formaldehyde compounds may be used singly or as a mixture of two or more kinds.

As the amines used as the catalyst, it is possible to cite triethylamine, triethanolamine, benzyldimethylamine, aqueous ammonia, and the like. Among them, triethylamine and aqueous ammonia are preferably used in view of readiness of synthesis.

The content of resol-type phenolic resin contained in the laminate 6 is preferably 40 to 60% by mass. If the content of resol-type phenolic resin is less than 40% by mass, the moldability (manufacturing) of the laminated sliding member 1 is adversely affected, whereas if the content exceeds 60% by mass, the mechanical strength of the laminate 6 is caused to decline.

As the polytetrafluoroethylene resin (hereinafter abbreviated as "PTFE") to be compounded with the resol-type phenolic resin, it is possible to use either a molding powder for molding (hereinafter abbreviated as "high molecular weight PTFE") or PTFE (hereinafter referred to as "low molecular weight PTFE") having the molecular weight lowered from that of the high molecular weight PTFE by such as irradiation. The molecular weight of the high molecular weight PTFE is, for example, approximately 700,000 to 10,000,000 or even higher, while the molecular weight of the low molecular weight PTFE is, for example, approximately 10,000 to 500,000 or thereabouts. The low molecular weight PTFE is primarily used as an additive and is readily crushable and highly dispersible.

As specific examples of the high molecular weight PTFE, it is possible to cite "Teflon (registered trademark) 7-J," "Teflon (registered trademark) 7A-J," "Teflon (registered trademark) 70-J," etc manufactured by Du Pont-Mitsui Fluorochemicals Co., Ltd.; "Polyflon M-12 (tradename)" etc. manufactured by Daikin Industries, Ltd.; and "Fluon G163 (tradename)," "Fluon G190 (tradename)," etc manufactured by Asahi Glass Co., Ltd.

As specific examples of the low molecular weight PTFE, it is possible to cite "TLP-10F (tradename)" etc. manufactured by Du Pont-Mitsui Fluorochemicals Co., Ltd.; "Lubron L-5 (tradename)" etc. manufactured by Daikin Industries, Ltd.; "Fluon L150J (tradename)," "Fluon L169J (tradename)," etc. manufactured by Asahi Glass Co., Ltd.; and "KTL-8N (tradename)," "KTL-2N (tradename)," etc manufactured by Kitamura Ltd.

While both of the high molecular weight PTFE and the low molecular weight PTFE may be used for the laminate 6, a powder of the low molecular weight PTFE is preferable in view of uniform dispersion and suppression of void formation when mixed with the resol-type phenolic resin. The average particle size of the PTFE powder is preferably 1 to 50 µm, and more preferably 1 to 30 µm, in view of ensuring uniform dispersion and preventing voids form being formed.

As for the content of PTFE contained in the laminate 6, 10 to 30% by mass is appropriate. If the content of PTFE is less than 10% by mass, an effect cannot be obtained in improving the friction and abrasion characteristics, whereas if the content exceeds 30% by mass, the viscosity of resin increases at the time of molding, may form voids, may reduce adhesiveness of the resol-type phenolic resin, may reduce the strength as the laminated sliding member 1, and may thereby induce interlayer delamination.

The polyester fiber woven fabric is formed into a woven fabric by spinning polyester fiber by a conventional method. The polyester fiber is generally obtained by polycondensation of a dicarboxylic acid component and a diol component. As the dicarboxylic acid component, it is possible to cite terephthalic acid, isophthalic acid, naphthalene-2,6-dicarboxylic acid, and the like; and as the diol component, it is possible to cite ethylene glycol, hydroquinone, bisphenol A, biphenyl, and the like. As those capable of serving as both components, it is possible to cite p-hydroxybenzoic acid, 2-oxy-6-naphthoic acid, and the like. A typical polyester fiber is obtained from polyethylene terephthalate (PET) having terephthalic acid and ethylene glycol as principle components. A typical polyester fiber is low in moisture absorption and water absorption properties and has a moisture content of 0.4 to 0.5%, whereas cotton normally has a moisture content of 8 to 9%.

The form of the spun yarn may be either a filament yarn made by twisting long fibers or a spun yarn made by twisting short fibers. In addition, the weave structure of the woven fabric is not particularly limited, and it is possible to adopt any one of three basic weaves including plain weave, twill weave, and satin weave, one of modified or derivative weaves including modified plain weave, modified twill weave, and modified satin weave, and a mixed weave of one of three basic waves and a modified weave.

The content of the polyester fiber woven fabric contained in the laminate 6 is preferably 25 to 35% by mass. If the content of the polyester fiber woven fabric is less than 25% by mass, a sufficient reinforcing effect cannot be obtained when used for the laminated sliding member 1, whereas if the content exceeds 35% by mass, the moldability (manufacturing) of the laminated sliding member 1 is adversely affected.

Figure 4:
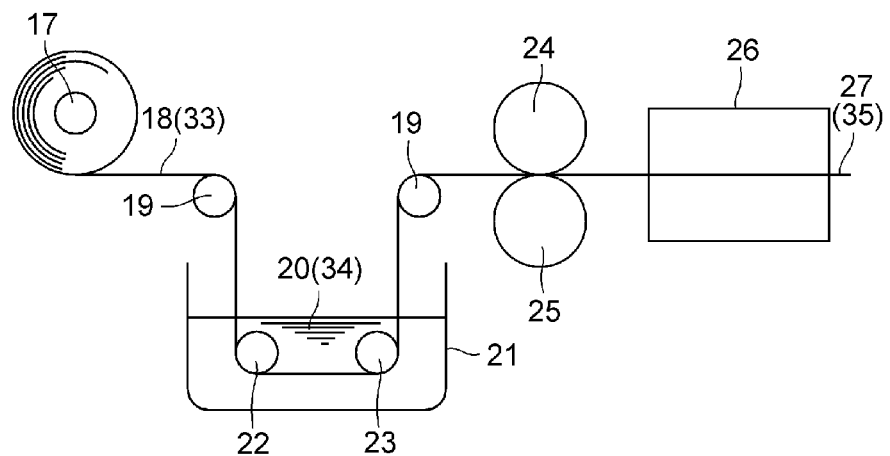
FIG. 4 is an explanatory diagram of an example of the manufacturing process of the embodiment shown in FIG. 1.

As the resol-type phenolic resin contained in the laminate 6 is set to 40 to 60% by mass, the polytetrafluoroethylene resin is set to 10 to 30% by mass, and the polyester fiber woven fabric is set to 25 to 35% by mass, it is possible to obtain a laminate which is excellent in all of moldability, mechanical strength, and friction and abrasion characteristics A prepreg (resin base) for the laminate 6 can be fabricated, for example, by using a manufacturing apparatus illustrated in FIG. 4. Namely, in the manufacturing apparatus illustrated in FIG. 4, a reinforcing base material 18 which is composed of a polyester fiber woven fabric wound up on an uncoiler 17 is fed by a feed roller 19 to a container 21 which contains a mixed liquid 20 composed of PTFE powder and a resol-type phenolic resin varnish with PTFE powder uniformly dispersed therein. The mixed liquid 20 is coated on the surface of the reinforcing base material 18, as the reinforcing base material 18 is allowed to pass through the mixed liquid 20 contained in the container 21 with the aid of guide rollers 22 and 23 provided in the container 21. The reinforcing base material 18 coated with the mixed liquid 20 is fed by the feed roller 19 to compression rolls 24 and 25, where the mixed liquid 20 coated on the surface of the reinforcing base material 18 is allowed to impregnate into voids in the fiber texture by the compression rolls 24 and 25. In a drying oven 26, the solvent is vaporized from the reinforcing base material 18 coated and impregnated with the mixed liquid 20, and a reaction of the resol-type phenolic resin varnish concurrently proceeds, thereby fabricating a moldable prepreg (resin base) 27 for the laminate 6.

In this manufacturing method, the solid content of the resol-type phenolic resin varnish prepared by dissolving the resol-type phenolic resin into a volatile solvent is approximately 30 to 65% by mass of the whole resin varnish, viscosity of the resin varnish is preferably 800 to 5000 cP, and particularly preferably 1000 to 4000 cP.

As shown in part (a) of FIG. 5, such a prepreg 27 is cut into a square shape in such a number of sheets as to ensure a desired finished thickness. Next, as shown in FIG. 6, the predetermined number of cut sheets of prepreg 27 are stacked and laminated in a square recess 29 of a die 28 of a heat pressing machine, and the stack is subsequently heated to a temperature of 140 to 160° C. in the die 28 and is pressure molded under a pressure of 4.9 to 7 MPa in the laminated direction by a ram 30, thereby obtaining a square laminated molding 31 in which the laminated prepregs 27 are joined to each other in a fused state, as shown in part (a) of FIG. 7. The laminated molding 31 is subjected to machining to form a disk-shaped laminate 6, as shown in part (b) of FIG. 7. The disk-shaped laminate 6 thus formed has high rigidity, excels in mechanical strength, and excels in friction and abrasion characteristics. In addition, since the amount of swelling in a wet atmosphere such as in oil or water is extremely small, the laminate 6 can be adopted in a wide variety of applications under dry frictional conditions, grease lubricated conditions, water lubricated conditions, and the like. As for the disk-shaped laminate 6, the square prepregs 27 shown in part (a) of FIG. 5 may be subjected to machining to fabricate disk-shaped prepregs 27a, as shown in part (b) of FIG. 5, and after a predetermined number of disk-shaped prepregs 27a are stacked and laminated in a circular recess 29a of the die 28 of a heat pressing machine, the stack may be subsequently heated to a temperature of 140 to 160° C. in the die 28 and may be pressure molded under a pressure of 4.9 to 7 MPa in the laminated direction by the ram 30, thereby obtaining a circular laminate 6, as shown in part (b) of FIG. 7.

Next, as shown in FIG. 8, the recessed portions 13 are formed in a surface 15 serving as the flat surface 3 of the disk-shaped laminate 6 by machining using an end mill, a drilling machine, or the like. Further, the slender hair-like fluff 16 of the polyester fiber woven fabric is formed on surfaces constituting the cylindrical wall surface 11 and the circular bottom wall surface 12 which define each of the recessed portions 13. Also, the slender hair-like fluff 16 of the polyester fiber woven fabric is formed on the surface 15 constituting the flat surface 3 after the surface 15 is subjected to surface roughening treatment by polishing or sandblasting.

The solid lubricant layer 5, which is adhered to the flat surface 3 of the laminate 6 in such a manner as to extend to the recessed portions 13 by being formed integrally with the fluff 16 in mixed form, contains a hydrocarbon-based wax, melamine cyanurate, PTFE, and a phosphate.

The hydrocarbon-based wax mainly imparts a low friction property to the solid lubricant layer 5, and the hydrocarbon-based wax is selected from at least one of a paraffin-based wax having a carbon number of about 24 or more, a olefin-based wax having a carbon number of about 26 or more, alkylbenzene having a carbon number of about 28 or more, and microcrystalline wax. As specific examples the hydrocarbon-based wax, it is possible to cite paraffin wax "150 (tradename)" and microcrystalline wax "Hi-Mic-1080 (tradename)" both manufactured by Nippon Seiro Co., Ltd.; polyethylene wax "Licowax PE 520 (tradename)" manufactured by Clariant Japan K.K.; a mixture of polyethylene wax and paraffin wax "Goddess Wax (tradename)" manufactured by Nikko Fine Products Co., Ltd., and the like. The compounding ratio of the hydrocarbon-based wax is preferably 20 to 40% by mass. If the compounding ratio is less than 20% by mass, the low friction property cannot be sufficiently exhibited, whereas if the compounding ratio exceeds 40% by mass, it results in weakening the joining force between the solid lubricant layer 5 and the surface 15.

Melamine cyanurate is an adduct of melamine with cyanuric acid or isocyanuric acid, and it has such a structure that the melamine molecules having a 6-membered ring structure and cyanuric acid (or isocyanuric acid) molecules having a 6-membered ring structure are arranged in a planar form through a hydrogen bond to form overlapped layers bonded to each other by a weak bonding force, so that the melamine cyanurate is considered to have a cleavage property similar to that of molybdenum disulfide or graphite. This melamine cyanurate serves to improve particularly the wear resistance and load-bearing capacity of the solid lubricant layer 5. The melamine cyanurate is not particularly limited, and it is possible to use a generally known melamine cyanurate. For example, it is possible to suitably use those described in JP-B-1970-5595, JP-B-1986-34430, JP-A-1993-310716, JP-A-1995-224049, and the like. Specifically, it is possible to cite "MCA-1 (tradename)" manufactured by Mitsubishi Chemical Corporation and "MC 600," "MC 860," "MC 4000," and "MC 6000" (all are tradenames), respectively manufactured by Nissan Chemical Industries, Ltd., and the like. The compounding ratio of the melanine cyanurate is preferably 15 to 30% by mass. If the compounding ratio is less than 15% by mass, it is impossible to obtain desired effects in improving the wear resistance and load-bearing capacity, whereas if the compounding ratio exceeds 30% by mass, the wear resistance and load-bearing capacity are lowered to the contrary.

PTFE together with the hydrocarbon-based wax imparts the low friction property and, as PTFE, it is possible to use either high molecular weight PTFE or low molecular weight PTFE in the same way as described above. The compounding ratio of PTFE is preferably 20 to 50% by mass. If the compounding ratio is less than 20% by mass, the low friction property cannot be sufficiently imparted to the solid lubricant layer 5, whereas if the compounding ratio exceeds 50% by mass, the ratio of exposure of the solid lubricant layer 5 on the sliding surface 2 becomes large, with the result that the wear resistance of the solid lubricant layer 5 is lowered, the shape retainability deteriorates, and the strength of the solid lubricant layer 5 is lowered.

The phosphate per se does not exhibit lubricity, but in sliding between the solid lubricant layer 5 and the mating member the phosphate serves to promote the film formability of a lubricating film of the solid lubricant layer 5 on the surface of the mating member. As the phosphates, it is possible to cite tertiary phosphates, secondary phosphates, pyrophosphates, phosphites, and metaphosphates of alkali metals or alkali earth metals. Specifically, it is possible to cite trilithium phosphate, dilithium hydrogenphosphate, lithium pyrophosphate, tricalcium phosphate, calcium monohydrogenphosphate, calcium pyrophosphate, lithium metaphosphate, magnesium metaphosphate, calcium metaphosphate, and the like. The compounding ratio of the phosphate is preferably 5 to 15% by weight. If the compounding ratio is less than 5% by mass, the phosphate may fail to exhibit a sufficient effect of promoting the formation of a lubricating film on the surface of the mating member, whereas if the compounding ratio exceeds 15% by mass, the amount of lubricating film transferred and attached to the surface of the mating member tends to be excessively large, so that the wear resistance of the solid lubricant layer 5 is lowered to the contrary.

The solid lubricant layer 5, which is composed of a lubricating composition including 20 to 40% by mass of a hydrocarbon-based wax, 10 to 30% by mass of melamine cyanurate, 20 to 50% by mass of PTFE, and 5 to 15% by mass of a phosphate, is obtained as follows: predetermined amounts of the above-described components are mixed in a mixing machine, such as a Henschel mixer, a super mixer, a ball mill, or a tumbler mixer; the mixture thus obtained is molded to fabricate a disk-shaped molding; and this molding is placed on the flat surface 3 of the laminate 6 and is, together with the laminate 6, subjected to compression molding to allow the solid lubricant layer 5 to be formed on the flat surface 3 of the laminate 6 in such a manner as to be filled in the recessed portions 13 and to be formed integrally with the slender hair-like fluff 16 of the polyester fiber woven fabric in mixed form, thereby forming the laminated sliding member 1.

Alternatively, as shown in FIG. 9, the laminated sliding member 1 may have the base body 4 which includes, in addition to the laminate 6, another laminate 32 which is integrally joined to another circular surface 41 of the laminate 6 and in which a plurality of sheets of inorganic fiber woven fabric or organic fiber woven fabric are superposed one upon another and joined to each other. The laminate 32 shown in FIG. 9 is fabricated by a manufacturing apparatus similar to that shown in FIG. 6. Namely, a reinforcing base material 33 composed of an organic fiber woven fabric or an inorganic fiber woven fabric wound up on the uncoiler 17 is fed by the feed roller 19 to the container 21 which contains a resol-type phenolic resin varnish 34. The resol-type phenolic resin varnish 34 is coated on the surface of the reinforcing base material 33, as the reinforcing base material 33 is allowed to pass through the resol-type phenolic resin varnish 34 contained in the container 21 with the aid of guide rollers 22 and 23 provided in the container 21. The reinforcing base material 33 coated with the resol-type phenolic resin varnish 34 is fed by the feed roller 19 to the compression rolls 24 and 25, where the resol-type phenolic resin varnish 34 is allowed to impregnate into voids in the fiber texture by the compression rolls 24 and 25. In the drying oven 26, the solvent is vaporized from the reinforcing base material 33 coated and impregnated with the resol-type phenolic resin varnish 34, and a reaction of the resol-type phenolic resin varnish 34 concurrently proceeds, thereby fabricating a moldable prepreg 35 for the laminate 32.

As the reinforcing fiber woven fabric which is used as the laminate 32, an inorganic fiber woven fabric such as a glass fiber woven fabric and a carbon fiber woven fabric or an organic fiber woven fabric such as an aramid resin fiber woven fabric (a copolyparaphenylene-3,4'-oxydiphenyleneterephthalic amide resin fiber woven fabric, e.g., "Technora (registered trademark)" manufactured by Teijin Techno Products Limited) is used.

As shown FIG. 10, after a desired number of sheets of prepreg 35 or 35a cut into a square or circular shape by machining are stacked and laminated in the square or circular recess 29 of the die 28 of the heat pressing machine, the prepregs 27 or 27a for the laminate 6 are placed on an upper surface thereof, and an assembly thereof is heated to a temperature of 140 to 160° C. in the die 28 and is pressure molded under a pressure of 4.9 to 7 MPa in the laminated direction by the ram 30, thereby obtaining a multilayered molding which is square or circular in a plan view. Thus, a multilayered molded member 36 is fabricated in which the laminated prepregs 27 or 27a for the laminate 6 and prepregs 35 or 35a for the laminate 32 are joined to each other in a fused state, as shown in FIG. 11. The multilayered molded member 36 thus fabricated includes the laminate 32 serving as a metal backing formed of an inorganic fiber woven fabric or an organic fiber woven fabric and the laminate 6 which is integrally joined to the one surface 37 of the laminate 32.

In the multilayered molded member 36 having such laminates 32 and 6, the recessed portions 13 and the fluff 16 are formed on the flat surface 3 of the laminate 6 in the same way as described above to form the base body 4, and the solid lubricant layer 5 is formed on this base body 4, thereby fabricating the laminated sliding member 1, as shown in FIG. 9.

Although, in the above-described embodiment, the other surface 41 of the laminate 6 and another surface 41a of the laminate 32 are formed into flat surfaces which are circular in a plan view, for example, disk-shaped prepregs 27a having different diameters may be stacked and laminated in a predetermined number and pressurized in the same way as described above, to thereby form the base body 4 provided with the laminate 6 which is circular in a plan view and has a convex spherical other surface 41b, as shown in FIG. 2.

Example 1

A prepreg for the laminate was used which was composed of 30% by mass of a polyester fiber woven fabric fabricated by a plain weave by using a spun yarn of No. 20 cotton count and setting the thread density to 43 ends/inch for the warp and to 42 picks/inch for the weft, 23% by mass of PTFE, and the balance of 47% by mass of a resol-type phenolic resin.

This prepreg was cut into a square shape whose length of one side was 200 mm, and 18 sheets of this prepreg were stacked and in the recess of the die of the heat pressing machine shown in FIG. 6 and having a square recess whose length of one side was 200.5 mm. This laminated assembly was then heated for 10 minutes to a temperature of 160° C. in the die and was pressure molded under a pressure of 7 MPa in the laminated direction, thereby obtaining a square laminated molding. The laminated molding thus obtained was subjected to machining, and a laminate having a diameter of 200 mm and a thickness of 8 mm and circular in a plan view was thereby fabricated.

On one flat surface of the laminate, a total of 169 recessed portions with a depth of 0.9 mm, including 6, 12, 18, 24, 30, 36, and 42 recessed portions arranged respectively on concentric circles equally spaced at 12.5 mm intervals and one recessed portion at the center O, were formed by end mill machining inside an imaginary circle spaced apart at the distance W of 8.5 mm (1.06-fold the diameter of the opening of the recessed portion) radially inwardly from the outer peripheral edge. Slender hair-like fluff of the polyester fiber woven fabric of the reinforcing base body was formed on the cylindrical inner wall surface and the circular bottom wall surface defining each of the recessed portions formed by this end mill machining. The one flat surface of the laminate where these recessed portions were formed was subjected to polishing, and slender hair-like fluff of the polyester fiber woven fabric was formed on that one flat surface. The imaginary circle constituted an envelope of the cylindrical wall surfaces defining the 42 recessed portions having their centers on the concentric circle with the largest diameter.

38% by mass of a mixture of polyethylene wax and paraffin wax "Goddess Wax (tradename)" manufactured by Nikko Fine Products Co., Ltd. as the hydrocarbon-based wax, 38% by mass of "KTL-2N (tradename)" manufactured by Kitamura Ltd. as PTFE, 17% by mass of "MCA-1 (tradename)" manufactured by Mitsubishi Chemical Corporation as melanine cyanurate, and 7% by mass of calcium pyrophosphate as a phosphate were charged into a Henschel mixer to prepare a mixture, and a disk-shaped sheet was fabricated by using this mixture.

This disk-shaped sheet was placed on the one flat surface of the laminate having the slender hair-like fluff of the polyester fiber woven fabric on the one flat surface and on the cylindrical inner wall surface and the circular bottom wall surface defining each of the 169 recessed portions, and was subjected to compression molding to allow a solid lubricant layer to be formed on the one flat surface of the laminate in such a manner as to be filled in the recessed portions and to be formed integrally with the slender hair-like fluff of the polyester fiber woven fabric in mixed form, thereby forming the laminated sliding member 1.

Example 2

In the same way as in Example 1, a laminate having a diameter of 200 mm and a thickness of 8 mm and circular in a plan view was fabricated.

In the same way as in Example 1, on the one flat surface of the laminate which was circular in a plan view, a total of 169 recessed portions with a depth of 0.9 mm, including 6, 12, 18, 24, 30, 36, and 42 recessed portions arranged respectively on imaginary concentric circles located at equal intervals of 13.8 mm and one recessed portion at the center, were formed by end mill machining inside an imaginary circle located at the distance W of 4.5 mm (0.5-fold the diameter of the opening of the recessed portion) radially inwardly from the outer peripheral edge. Thereafter, in the same way as in Example 1, a solid lubricant layer was formed on the one flat surface of the laminate having a total of 169 recessed portions, thereby forming the laminated sliding member 1.

Comparative Example

In the same way as in Example 1, a laminate which was circular in a plan view and had a diameter of 200 mm and a thickness of 8 mm was fabricated.

On one flat surface of such a laminate, a total of 169 recessed portions with a depth of 0.9 mm, including 6, 12, 18, 24, 30, 36, and 42 recessed portions arranged respectively on concentric circles equally spaced at 14.0 mm intervals and one recessed portion at the center O, were formed by end mill machining inside an imaginary circle spaced apart at the distance W of 2.5 mm (0.31-fold the diameter of the opening of the recessed portion) radially inwardly from the outer peripheral edge. Thereafter, in the same way as in Example 1, a solid lubricant layer was formed on the one flat surface of the laminate having a total of 169 recessed portions, thereby forming the laminated sliding member 1 shown in FIG. 15.

Next, with respect to the laminated sliding members according to Example 1, Example 2, and Comparative Example, friction performance was tested under the below-described test conditions.

Test Conditions

Surface pressure: 20 MPa, 40 MPa, 60 MPa

Excitation velocity: 1 cm/sec, 5 cm/sec, 10 cm/sec, 20 cm/sec, 30 cm/sec, 60 cm/sec Mating member: stainless steel plate (SUS 316)

Test method: The solid lubricant layer of the laminated sliding member was brought into sliding contact with the surface of the mating member fixed on a base of a biaxial testing machine, a load was applied to the laminated sliding member such that the surface pressure becomes 20 MPa, 40 MPa, and 60 MPa, and the mating member was vibrated by sinusoidal waves with an amplitude of ±200 mm 11 times (11 cycles).

The test results are shown in Table 1 to Table 3.

TABLE 1

|  | Surface Pressure (MPa) | Excitation Velocity (cm/sec) | Friction Coefficient |
|---|---|---|---|
| Example 1 | 20 | 1 | 0.0500 |
|  |  | 5 | 0.0469 |
|  |  | 10 | 0.0391 |
|  |  | 20 | 0.0335 |
|  |  | 30 | 0.0298 |
|  |  | 60 | 0.0231 |
|  | 40 | 1 | 0.0382 |
|  |  | 5 | 0.0316 |
|  |  | 10 | 0.0280 |
|  |  | 20 | 0.0234 |
|  |  | 30 | 0.0217 |
|  |  | 60 | 0.0171 |
|  | 60 | 1 | 0.0317 |
|  |  | 5 | 0.0248 |
|  |  | 10 | 0.0245 |
|  |  | 20 | 0.0204 |
|  |  | 30 | 0.0186 |
|  |  | 60 | 0.0152 |

TABLE 2

|  | Surface Pressure (MPa) | Excitation Velocity (cm/sec) | Friction Coefficient |
|---|---|---|---|
| Example 2 | 20 | 1 | 0.0482 |
|  |  | 5 | 0.0426 |
|  |  | 10 | 0.0342 |
|  |  | 20 | 0.0290 |
|  |  | 30 | 0.0276 |
|  |  | 60 | 0.0246 |
|  | 40 | 1 | 0.0405 |
|  |  | 5 | 0.0336 |
|  |  | 10 | 0.0273 |
|  |  | 20 | 0.0234 |
|  |  | 30 | 0.0225 |
|  |  | 60 | 0.0209 |
|  | 60 | 1 | 0.0404 |
|  |  | 5 | 0.0264 |
|  |  | 10 | 0.0221 |
|  |  | 20 | 0.0189 |
|  |  | 30 | 0.0177 |
|  |  | 60 | 0.0157 |

TABLE 3

|  | Surface Pressure (MPa) | Excitation Velocity (cm/sec) | Friction Coefficient |
|---|---|---|---|
| Comparative Example | 20 | 1 | 0.0556 |
|  |  | 5 | 0.0491 |
|  |  | 10 | 0.0386 |
|  |  | 20 | 0.0321 |
|  |  | 30 | 0.0320 |
|  |  | 60 | 0.0311 |
|  | 40 | 1 | 0.0513 |
|  |  | 5 | 0.0348 |
|  |  | 10 | 0.0270 |
|  |  | 20 | 0.0252 |
|  |  | 30 | 0.0241 |
|  |  | 60 | 0.0233 |
|  | 60 | 1 | 0.0324 |
|  |  | 5 | 0.0273 |
|  |  | 10 | 0.0242 |
|  |  | 20 | 0.0211 |
|  |  | 30 | 0.0206 |
|  |  | 60 | 0.0189 |

From the above-described test results, a large difference was not recognized in the friction performance among the laminated sliding members according to Example 1, Example 2, and Comparative Example; however, a large difference was recognized in the form of the sliding surface of the laminated sliding member after the test. Namely, since the width (distance W) of the annular flat surface of the sliding surface of the laminated sliding member in Comparative Example was as small as 0.31-fold the opening diameter of the recessed portion, the solid lubricant layer at the outer peripheral edge flowed outside the sliding surface, and damage such as cracking and chipping, deformation, and the like were noted on the outer peripheral edge.

In the laminated sliding members of Examples 1 and 2, since the annular flat surface had the width (distance W) 0.5-fold to 1.06-fold the opening diameter of the recessed portion, even when the laminated sliding member is subjected to high-velocity sliding during an earthquake, e.g., high-velocity sliding of 60 cm/sec, the laminated sliding member exhibits excellent friction performance, and defects including damage such as cracking and chipping, deformation, and the like do not occur at the sliding surface.

As shown in FIGS. 12 and 13, a sliding bearing 39 incorporating the above-described laminated sliding member 1 is comprised of a lower shoe 52 having a recessed portion 51 which is circular in a plan view and is open at one surface 40 thereof; a rubber elastomer 54 which is circular in a plan view, is accommodated tightly in the recessed portion 51 of the lower shoe 52, and has an annular notched stepped portion 53 at an outer peripheral edge of an upper surface thereof; an annular ring 55 fitted and fixed in the notched stepped portion 53; an intermediate plate 58 which is circular in a plan view, is disposed on the upper surface of the rubber elastomer 54 so as to be swingable and rotatable relative to the lower shoe 52, and has a circular recessed portion 57 in an upper surface 56 thereof; the laminated sliding member 1 fitted and fixed in the recessed portion 57 of the intermediate plate 58; and an upper shoe 60 having fixed thereon a slide plate 59 which is brought into slidable contact with the sliding surface 2 of the solid lubricant layer 5 of the laminated sliding member 1.

The annular ring 55 has a synthetic resin-made protective ring 62 which is inserted and fitted in the notched stepped portion 53 of the rubber elastomer 54 and a metallic compression ring 63 which is disposed on an upper surface of the protective ring 62 and is inserted and fitted in the annular notched stepped portion 53 of the rubber elastomer 54. The annular ring 55 is adapted to prevent the damage of the rubber elastomer 54 by preventing an outer peripheral edge portion of the rubber elastomer 54 from jutting out from a clearance 64 between an outer peripheral surface of the intermediate plate 58 and a wall surface at the recessed portion 51 of the lower shoe 52.

A sliding bearing 71 in accordance with another embodiment shown in FIG. 17 is comprised of a lower shoe 74 having a concave spherical surface 73 on one surface 72 thereof; the laminated sliding member 1 which has the sliding surface 2 of the solid lubricant layer 5 and the convex spherical surface 41b, and is, at the surface 41b thereof, brought into slidable contact with the concave spherical surface 73; and the upper shoe 60 having fixed thereon the slide plate 59 which is brought into slidable contact with the sliding surface 2 of the laminated sliding member 1.

In the sliding bearings 39 and 71 shown in FIGS. 12, 13 and 14, a plurality of anchor bolts 81, which are embedded in and fixed to a lower structure of a bridge pier or the like, are fixed to the lower surface of each of the lower shoes 52 and 74, while a plurality of anchor bolts 82, which are embedded in and fixed to an upper structure of the bridge pier or the like, are fixed to the upper shoe 60.

Since the laminated sliding member 1 is used, the sliding bearings 39 and 71 exhibit excellent friction performance even when subjected to high-velocity sliding of, e.g., 60 cm/sec during an earthquake.

DESCRIPTION OF REFERENCE NUMERALS AND SIGNS

1: laminated sliding member
2: sliding surface
3, 3a: flat surface
4: base body
5: solid lubricant layer
6, 32: laminate
7: outer peripheral edge
8: annular flat surface
13: recessed portion
16: fluff
39, 71: sliding bearing

The invention claimed is:

1. A laminated sliding member comprising: a base body having a plurality of recessed portions in one surface thereof; and a solid lubricant layer adhered to at least the one surface of said base body,
    said solid lubricant layer extending into the plurality of recessed portions of said base body,
    wherein said base body has a laminate having the one surface and formed by superposing and mutually joining a plurality of polyester fiber woven fabrics impregnated with a resol-type phenolic resin containing a polytetrafluoroethylene resin,
    wherein said one surface of the laminate comprises an annular outer surface surrounded by an outer peripheral edge of the one surface of the laminate and by an imaginary line located in such a way as to be spaced apart a predetermined distance inwardly from the outer peripheral edge and similar in shape to the outer peripheral edge, and an inner surface surrounded by the imaginary line and located inwardly with respect to the annular outer surface,
    the plurality of recessed portions being open at the inner surface of the one surface of the laminate,
    each of the plurality of recessed portions being defined by a cylindrical wall surface in the laminate and a circular bottom wall surface in the laminate,
    wherein the one surface of the laminate, the cylindrical wall surfaces, and the circular bottom wall surfaces have fluff of the polyester fiber woven fabric, respectively,
    said solid lubricant layer being adhered to at least the one surface of the laminate in such a manner as to be formed integrally with the fluff in mixed form, and
    wherein the predetermined distance from the outer peripheral edge of the one surface of the base body to the imaginary line is 0.5- to 1.1 times an opening diameter of the recessed portion.

2. The laminated sliding member according to claim 1, wherein said base body further has another laminate which is integrally joined to another surface of the laminate and in which a plurality of sheets of inorganic fiber woven fabric or organic fiber woven fabric are superposed one upon another and joined to each other.

3. The laminated sliding member according to claim 1, wherein the plurality of recessed portions are arranged by respectively having centers on a plurality of imaginary concentric annular lines which have a center on the one surface of the laminate and equal intervals between each other in an outward direction from the center, and are similar in shape to the outer peripheral edge.

4. The laminated sliding member according to claim 3, wherein the one surface of said base body is circular in a plan view, the plurality of imaginary concentric annular lines are constituted by a plurality of imaginary concentric circles, and on an n-th (n is a positive integer) imaginary concentric circle from the center of the one surface among the plurality of imaginary concentric circles, a 6×n number of recessed portions are respectively arranged at mutually equal center angles between adjacent ones of the recessed portions with respect to n-th imaginary concentric circle.

5. The laminated sliding member according to claim 1, wherein the one surface is circular in a plan view, the imaginary line is constituted by a circle, the outer surface is annular in shape, and the inner surface is circular in shape.

6. The laminated sliding member according to claim 1, wherein the laminate comprises 40 to 60% by mass of a resol-type phenolic resin, 10 to 30% by mass of a polytetrafluoroethylene resin, and 25 to 35% by mass of a polyester fiber woven fabric.

7. The laminated sliding member according to claim 1, wherein said solid lubricant layer contains a hydrocarbon-based wax, polytetrafluoroethylene, melamine cyanurate, and a phosphate.

8. The laminated sliding member according to claim 7, wherein said solid lubricant layer contains 20 to 40% by mass of the hydrocarbon-based wax, 20 to 50% by mass of the polytetrafluoroethylene, 15 to 30% by mass of the melamine cyanurate, and 5 to 15% by mass of the phosphate.

9. The laminated sliding member according to claim 1, wherein said base body has another surface opposite said one surface.

10. The sliding member according to claim 9, wherein the other surface is circular in a plan view.

11. The sliding member according to claim 1, wherein said base body has a convex spherical surface opposite said one surface.

12. The sliding member according to claim 11, wherein the convex spherical surface is circular in a plan view.

13. A sliding bearing comprising: a lower shoe having a recessed portion which is open at one surface thereof; a rubber elastomer which is accommodated in the recessed portion of said lower shoe, and has an annular notched stepped portion at an outer peripheral edge of an upper surface thereof; an annular ring fitted and fixed in the notched stepped portion; an intermediate plate which is disposed on the upper surface of said rubber elastomer so as to be swingable and rotatable relative to said lower shoe, and has a recessed portion in an upper surface thereof; a laminated sliding member according to claim 10 fitted and fixed in the recessed portion of said intermediate plate; and an upper shoe having fixed thereon a slide plate which is brought into slidable contact with said solid lubricant layer of the laminated sliding member.

14. The sliding bearing according to claim 13, wherein the recessed portion of said lower shoe, said rubber elastomer, and said intermediate plate are circular in a plan view.

15. The sliding bearing according to claim 13, wherein said annular ring has a synthetic resin-made protective ring which is fitted in the annular notched stepped portion of said rubber elastomer and a metallic compression ring which is disposed on an upper surface of the protective ring and is fitted in the annular notched stepped portion of said rubber elastomer.

16. A sliding bearing comprising: a lower shoe having a concave spherical surface on one surface thereof; a laminated sliding member according to claim 11 which is disposed on said lower shoe such that the convex spherical surface thereof is brought into contact with the concave spherical surface of said lower shoe; and an upper shoe having fixed thereon a slide plate which is brought into slidable contact with said solid lubricant layer of the laminated sliding member.

17. A sliding bearing comprising: a lower shoe having a recessed portion which is open at one surface thereof; a rubber elastomer which is accommodated in the recessed portion of said lower shoe, and has an annular notched stepped portion at an outer peripheral edge of an upper surface thereof; an annular ring fitted and fixed in the notched stepped portion; an intermediate plate which is disposed on the upper surface of said rubber elastomer so as to be swingable and rotatable relative to said lower shoe, and has a recessed portion in an upper surface thereof; a laminated sliding member fitted and fixed in the recessed portion of said intermediate plate; and an upper shoe having fixed thereon a slide plate which is brought into slidable contact with a solid lubricant layer of the laminated sliding member,
said laminated sliding member comprising: a base body having a plurality of recessed portions in one surface thereof; and the solid lubricant layer being adhered to at least the one surface of said base body,
said solid lubricant layer extending into the plurality of recessed portions of said base body,
wherein said base body has a laminate having the one surface and formed by superposing and mutually joining a plurality of polyester fiber woven fabrics impregnated with a resol-type phenolic resin containing a polytetrafluoroethylene resin,
wherein said one surface of the laminate comprises an annular outer surface surrounded by an outer peripheral edge of the one surface of the laminate and by an imaginary line located in such a way as to be spaced apart a predetermined distance inwardly from the outer peripheral edge and similar in shape to the outer peripheral edge, and an inner surface surrounded by the imaginary line and located inwardly with respect to the annular outer surface,
the plurality of recessed portions being open at the inner surface of the one surface of the laminate,
each of the plurality of recessed portions being defined by a cylindrical wall surface in the laminate and a circular bottom wall surface in the laminate,
wherein the one surface of the laminate, the cylindrical wall surfaces, and the circular bottom wall surfaces have fluff of the polyester fiber woven fabric, respectively,
said solid lubricant layer being adhered to at least the one surface of the laminate in such a manner as to be formed integrally with the fluff in mixed form, and
wherein said annular ring has a synthetic resin-made protective ring which is fitted in the annular notched stepped portion of said rubber elastomer and a metallic compression ring which is disposed on an upper surface of the protective ring and is fitted in the annular notched stepped portion of said rubber elastomer.

\* \* \* \* \*